United States Patent
Borrelli et al.

(10) Patent No.: US 12,181,711 B2
(45) Date of Patent: Dec. 31, 2024

(54) OPTICAL SYSTEMS COMPRISING BINARY PHOTONICS LATTICES

(71) Applicant: CORNING INCORPORATED, Corning, NY (US)

(72) Inventors: Nicholas Francis Borrelli, Elmira, NY (US); Dan Trung Nguyen, Painted Post, NY (US); Daniel Aloysius Nolan, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 120 days.

(21) Appl. No.: 17/766,793

(22) PCT Filed: Sep. 22, 2020

(86) PCT No.: PCT/US2020/051929
§ 371 (c)(1),
(2) Date: Apr. 6, 2022

(87) PCT Pub. No.: WO2021/071664
PCT Pub. Date: Apr. 15, 2021

(65) Prior Publication Data
US 2024/0069279 A1   Feb. 29, 2024

Related U.S. Application Data

(60) Provisional application No. 62/912,153, filed on Oct. 8, 2019.

(51) Int. Cl.
*G02B 6/122* (2006.01)
*G02B 6/12* (2006.01)

(52) U.S. Cl.
CPC .. *G02B 6/1225* (2013.01); *G02B 2006/12147* (2013.01); *G02B 2006/1215* (2013.01)

(58) Field of Classification Search
CPC .......... G02B 6/1225; G02B 2006/1215; B82Y 10/00; B82Y 20/00
(Continued)

(56) References Cited

U.S. PATENT DOCUMENTS

| 4,042,814 A | 8/1977 | Taylor |
| 5,239,598 A * | 8/1993 | Wight ..................... G02F 1/295 257/431 |

(Continued)

FOREIGN PATENT DOCUMENTS

| EP | 1859314 A1 | 11/2007 |
| WO | 2004/003598 A2 | 1/2004 |
| WO | 2006/078495 A1 | 7/2006 |

OTHER PUBLICATIONS

"Photon transport in binary photonic lattices" by Rodriguez-Lara et al, Phys. Scr. 87, paper 038116 (Year: 2013).*
(Continued)

*Primary Examiner* — Robert Tavlykaev
(74) *Attorney, Agent, or Firm* — Svetlana Z. Short

(57) ABSTRACT

A binary photonics lattice that includes a waveguide array having a plurality of single mode waveguides disposed in a substrate, the plurality of single mode waveguides including one or more first waveguides having a first V-number $V_1$ and one or more second waveguides having a second V-number $V_2$. The first V-number $V_1$ is smaller than the second V-number $V_2$. The one or more first and second waveguides are arranged in a linear distribution having first and second edge waveguide regions and a binary waveguide region positioned between the first and second edge waveguide regions. The binary waveguide region is a symmetrical binary representation of a decimal number of two or greater. Further, the binary waveguide region includes at least one first waveguide representing a digit 0 of the symmetrical
(Continued)

binary representation and/or at least one second waveguide representing a digit 1 of the symmetrical binary representation.

26 Claims, 11 Drawing Sheets

(58) Field of Classification Search
USPC .................................. 385/1–3, 14, 15, 39, 42
See application file for complete search history.

(56) References Cited

U.S. PATENT DOCUMENTS

| | | | |
|---|---|---|---|
| 5,717,225 | A | 2/1998 | Lomashevich |
| 7,302,129 | B2 | 11/2007 | Howard |
| 8,494,311 | B1 | 7/2013 | Wach |
| 9,140,853 | B2 | 9/2015 | Varghese et al. |
| 9,261,714 | B2 | 2/2016 | Kim et al. |
| 11,165,508 | B2 | 11/2021 | Borrelli et al. |
| 2006/0159383 | A1 | 7/2006 | Jones |
| 2010/0065726 | A1 | 3/2010 | Zhong et al. |
| 2016/0231506 | A1 | 8/2016 | Jiang |
| 2017/0307958 | A1 | 10/2017 | Abel et al. |
| 2019/0265952 | A1 | 8/2019 | Peng et al. |

OTHER PUBLICATIONS

"Dirac solitons in square binary waveguide lattices" by Tran et al, Physical Review A 91, paper 023814 (Year: 2015).*

"Localized quantum walks in quasi-periodic Fibonacci arrays of waveguides" by Nguyen et al, Optics Express, vol. 27, No. 2 pp. 886-898 (Year: 2019).*

"Realization of Quantum Walks with Negligible Decoherence in Waveguide Lattices" by Perets et al, Physical Review Letters, vol. 100, paper 170506 (Year: 2008).*

"Localization of Light in Photonics Lattices for All-Optical Representation of Binaries" by Nguyen et al, Frontiers in Physics, vol. 9, paper 709428 (Year: 2021).*

Athanasios Theocharidi S, et al, "Linear and Nonlinear Optical Pulse Propagation in Photonic Crystal Waveguides Near the Band Edge", IEEE Journal of Quantum Electronics, vol. 44, No. 11, Nov. 2008, pp. 1020-1027.

International Search Report and Written Opinion of the International Searching Authority; PCT/US20/051929; mailed on Jan. 12, 2021, 13 pages; European Patent Office.

Markus Grafe, et al, "Integrated photonic quantum walks", Journal of Optics, Institute of Physics Publishing, Bristol GB, vol. 18, No. 10, Sep. 2016, pp. 103002.

Shteeman V R, et al, "Extension of Coupled Mode Analysis to Infinite Photonic Superlattices", IEEE Journal of Quantum Electronics, vol. 44, No. 9, Sep. 2008, pp. 826-833.

A. M. M. Wald, "More than Moore", Nature, vol. 530, 145, 2016.

A. Miller, et al., "Nonlinear Optical Materials and Devices for Applications in Information Technology", Nato Asi Series, Advanced Science Institutes Series, Series E: Applied Sciences, vol. 289, 1995.

G. A. De Biase, et al., "Parallel optical arithmetic on images by a redundant binary number representation", Applied Optics, vol. 29, No. 11, Apr. 1990, pp. 1587-1589.

H. Tang, et al., "Experimental two-dimensional quantum walks on a photonic chip," Sci. Adv. 4: eaat3174, 2018.

J.-S Jang et al., "Optical representation of binary data based on both intensity and phase modulation with a twisted-nematic liquid-crystal display for holographic digital data storage", Optics Lett. vol. 26, 2001, pp. 1797-1780.

K. R. Chowdhury, et al., "An All-Optical Binary Comparator Using Non-Linear Material", J. of Optics, vol. 33 (2), 2004, pp 81-85.

M-L Ren, et al., "Strong modulation of second-harmonic generation with very large contrast in semiconducting CdS via high-field domain" Nature Comm. vol. 9, 2018.

M. Heck "Optical computers light up the horizon", Phys. Org. Mar. 20, 2018. https://phys.org/news/2018-03-optical-horizon.html.

M. Soljacic, et al., "All-optical switching using optical bistability in non-linear photonic crystals", Proceedings of SPIE vol. 5000, 2003, pp. 200-214.

P. Ambs "Optical Computing: A 60-Year Adventure", Advances in Optical Technologies, vol. 2010, Article ID 372652, 15 pages. doi: 10.1155/2010/372652.

R. Rajan et al., "All-optical logic gates show promise for optical computing", Photonics Spectra, Apr. 2018.

S. D. Smith et al., "Nonlinear optical circuit elements as logic gates for optical computers: the first digital optical circuits", Opt Eng. vol. 24(4), 1885, pp. 569-574.

\* cited by examiner

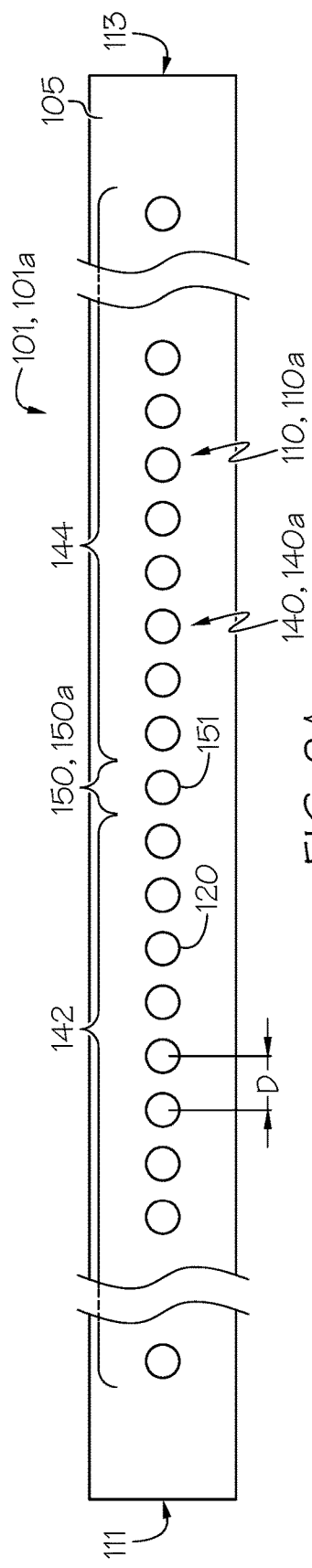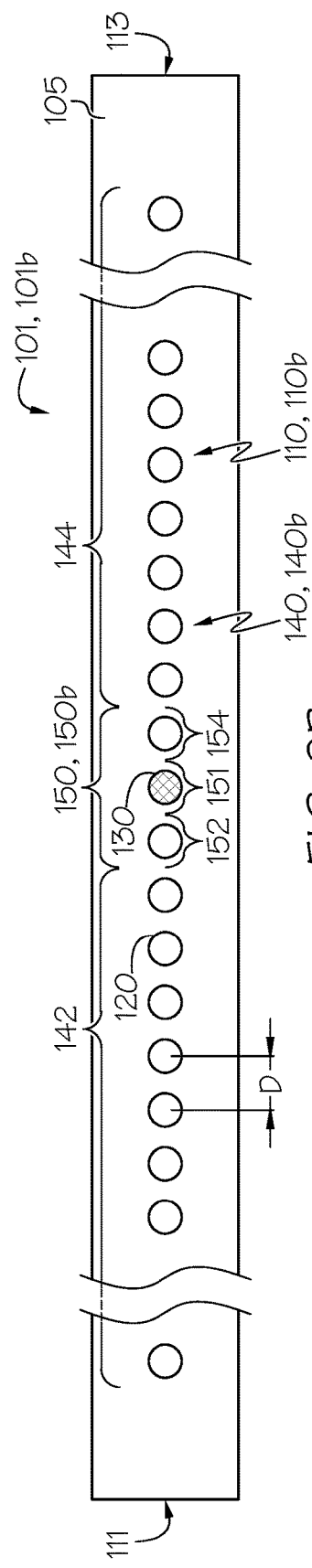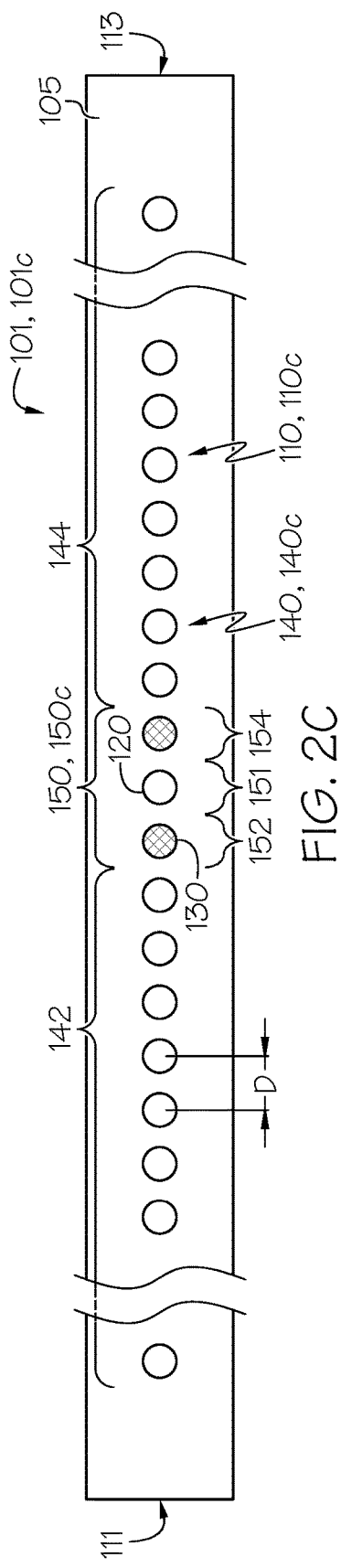

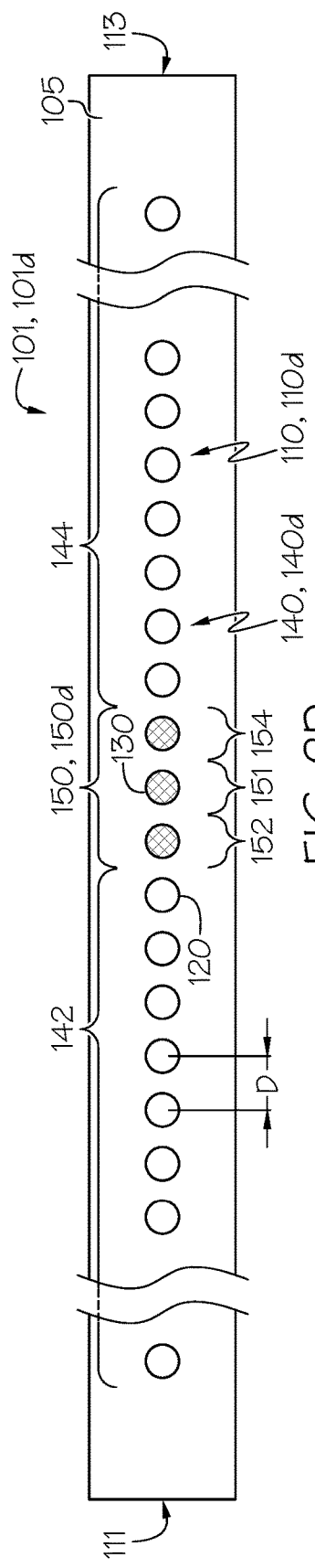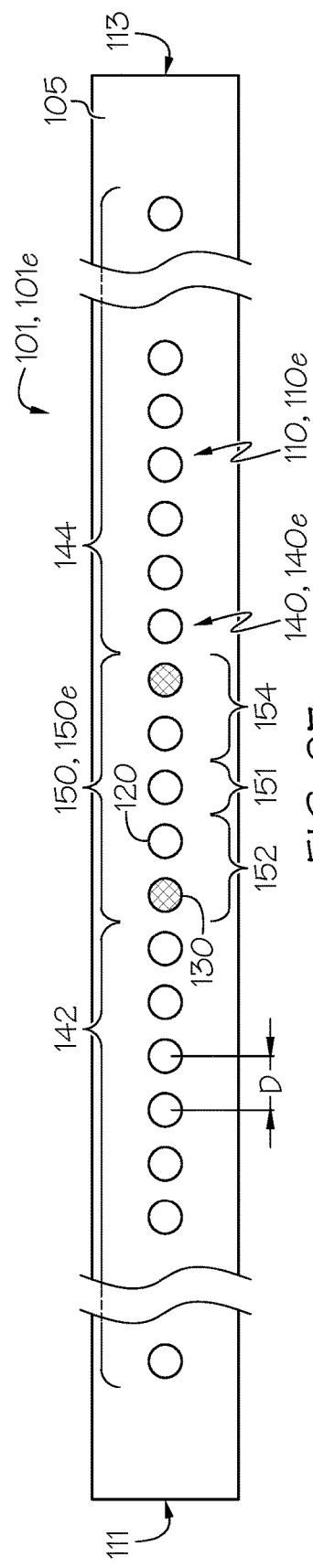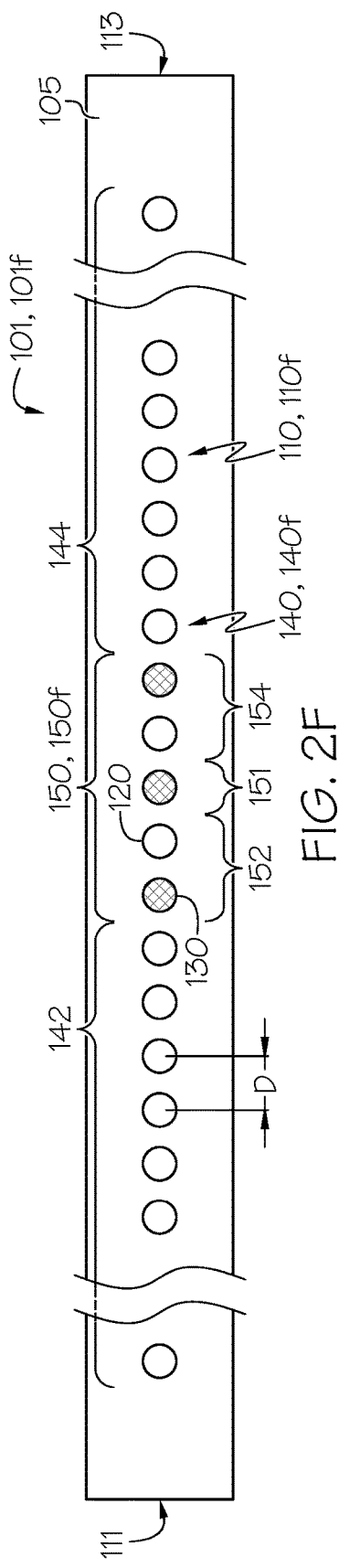

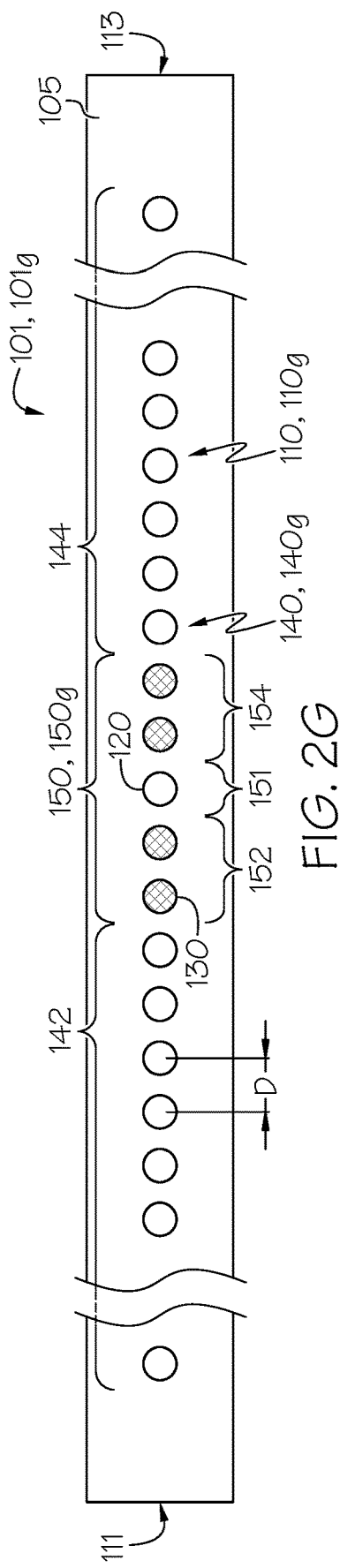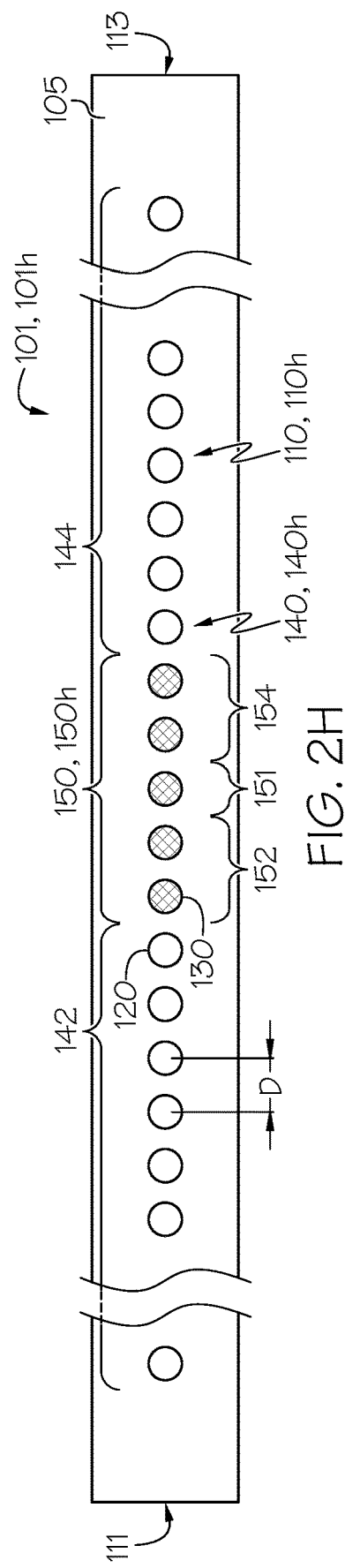

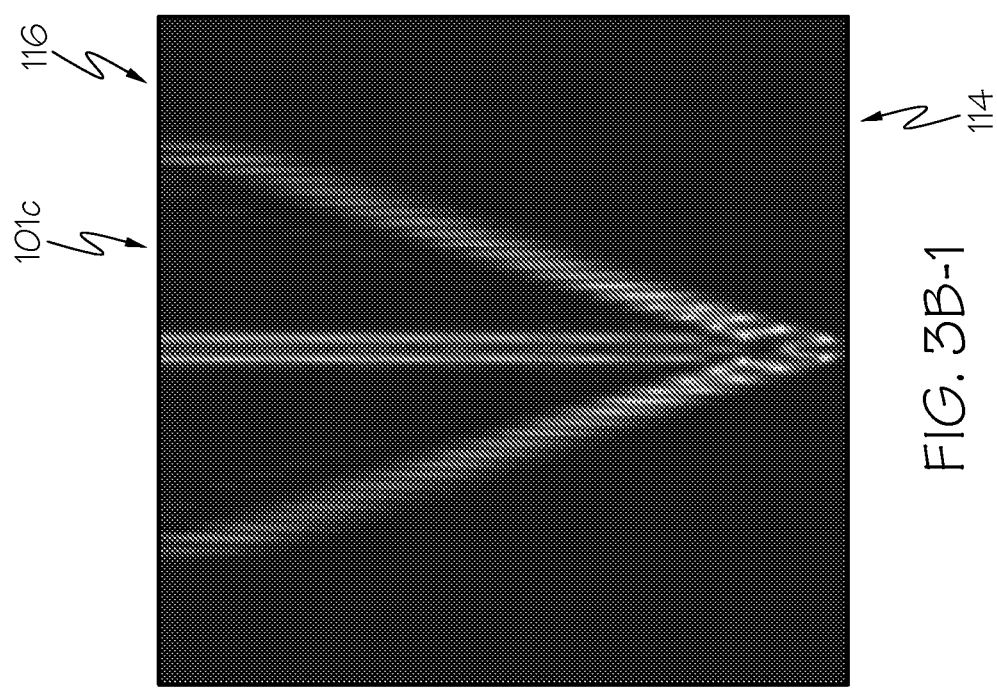
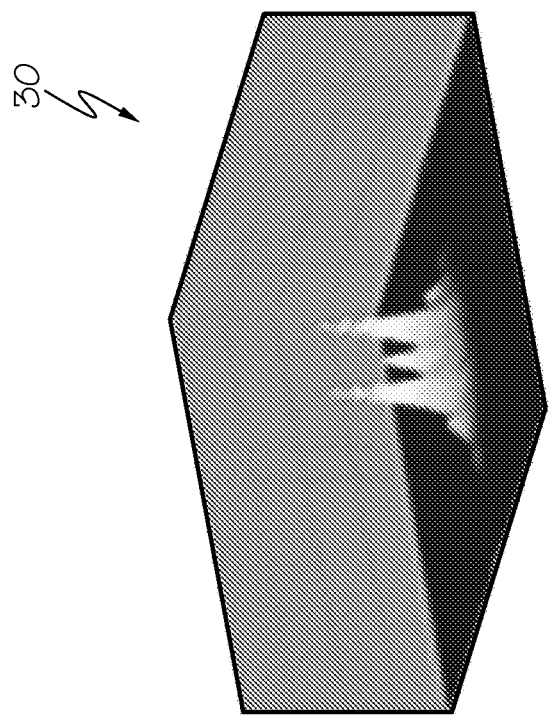
FIG. 3B-1
FIG. 3B-2

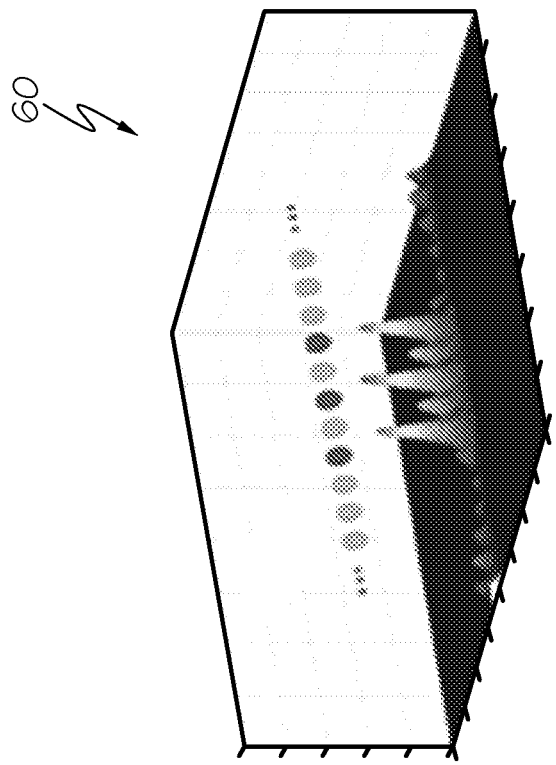
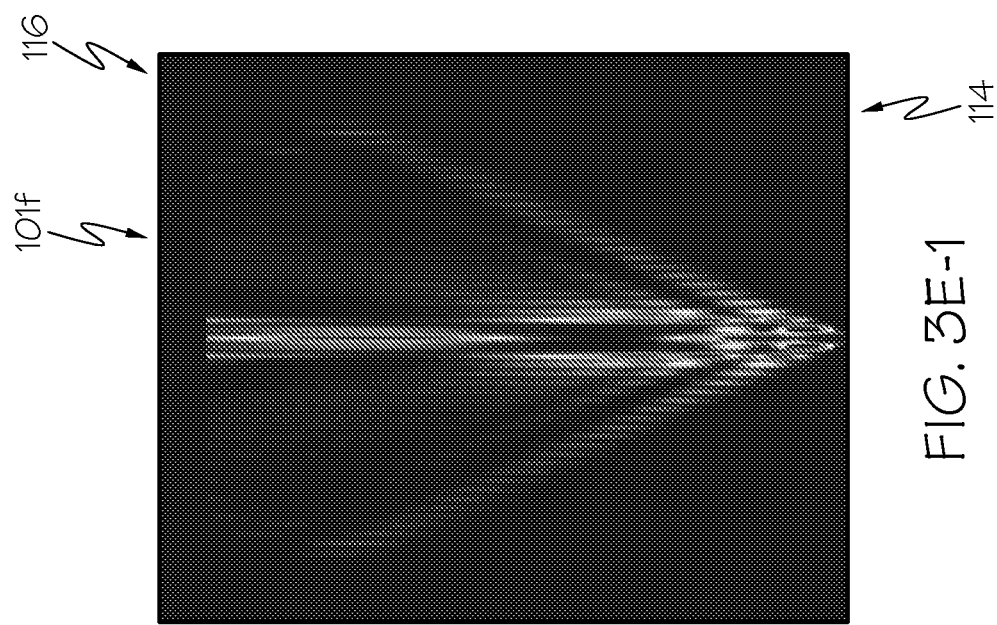
FIG. 3E-2
FIG. 3E-1

OPTICAL SYSTEMS COMPRISING BINARY PHOTONICS LATTICES

CROSS-REFERENCE TO RELATED APPLICATIONS

This application claims the benefit of priority under 35 U.S.C. § 371 of International Application No. PCT/US2020/051929, filed on Sep. 22, 2020, which claims the benefit of priority under 35 U.S.C. § 119 of U.S. Provisional Application Ser. No. 62/912,153 filed on Oct. 8, 2019, the content of which is relied upon and incorporated herein by reference in its entirety.

TECHNICAL FIELD

The present disclosure relates to optical systems comprising binary photonics lattices that may be used to generate optical representations of binary numbers.

BACKGROUND

Optical computing using photonics devices has a number of advantages over traditional electrical computing. Optical signals do not have the temporal response limitations of electronic signals and optical signals do not require insulators. In optical computing, hundreds or even thousands of photon signal streams may be sent simultaneously using different frequencies. Furthermore, optical systems facilitate low-loss transmission and provide both a large bandwidth and a multiplexing capability, which allow communication over several channels in parallel without interference. Photonics devices are compact, lightweight, and inexpensive to manufacture, and better at storing information than magnetic materials. By replacing electrons and wires with photons and photonics devices will facilitate computing speeds that greatly outpace current computing technology. By current estimates, an optical computer could perform more than $10^{17}$ bits operations per second, compared to the gigabits ($10^9$) per second rates achievable using current electronics.

However, achieving an all-optical computer has been difficult, because current optics are not suitable for performing calculations in binary (i.e., in '1s' and '1s'). Indeed, optical representation of binaries is one of the key components to facilitate optical computing. An optical representation of a binary communicates a binary number at light speed without the delays of electrical transistors. Binary is a base-2 number system that uses two states—0 and 1—to represent a number or binary representation. Binary representations are important for digital logic or digital logic gates in digital computing. Current computers use semiconductor transistors to electrically represent binary. In optical digital computing, it is preferred that binary representations are performed optically. Indeed, without optical binary representations, optical computing is limited to optical analog computing which is less powerful than current digital computers. Accordingly, methods and systems for performing optical binary representations are desired.

Conventionally, optical transistors have been proposed to optically represent binaries and operate analogous to electrical transistors in electrical digital computers. Optical transistors operate based on nonlinear interactions between light and material or optical nonlinearity, which is much weaker than electrical nonlinearity in electrical transistors. Therefore, high power is usually required for each optical transistor, making conventional optical transistors impractical for applications in optical computing when a large number of optical transistors (millions or even billions) are needed. Furthermore, without a system of many optical nonlinear elements operating at high power may also be unstable. Accordingly, a need exists for systems and apparatuses for generating optical representations of binaries at low power without relying on optical nonlinearity.

SUMMARY

In a first aspect A1, a binary photonics lattice includes a waveguide array having a plurality of single mode waveguides disposed in a substrate, the plurality of single mode waveguides including one or more first waveguides having a first V-number $V_1$ and one or more second waveguides having a second V-number $V_2$. The first V-number $V_1$ is smaller than the second V-number $V_2$. The one or more first waveguides and the one or more second waveguides are arranged in a linear distribution having a first edge waveguide region, a second edge waveguide region, and a binary waveguide region positioned between the first edge waveguide region and the second edge waveguide region. The binary waveguide region is a symmetrical binary representation of a decimal number of two or greater. Further, the binary waveguide region includes at least one first waveguide representing a digit 0 of the symmetrical binary representation, at least one second waveguide representing a digit 1 of the symmetrical binary representation, or both at least one first waveguide representing a digit 0 of the symmetrical binary representation and at least one second waveguide representing a digit 1 of the symmetrical binary representation.

A second aspect A2 includes the binary photonics lattice of the first aspect A1, where the decimal number is three or greater.

A third aspect A3 includes the binary photonics lattice of any one of the first-second aspects A1-A2, where the decimal number is four or greater.

A fourth aspect A4 includes the binary photonics lattice of any one of the first-third aspects A1-A3, where the decimal number is six or greater.

A fifth aspect A5 includes the binary photonics lattice of any one of the first-fourth aspects A1-A4, where the decimal number is eight or greater.

A sixth aspect A6 includes the binary photonics lattice of any one of the first-fifth aspects A1-A5, where each waveguide of the first edge waveguide region and the second edge waveguide region includes a first waveguide.

A seventh aspect A7 includes the binary photonics lattice of any one of the first-seventh aspects A1-A6, where the first edge waveguide region and the second edge waveguide region each comprise the same number of waveguides.

An eighth aspect A8 includes the binary photonics lattice of any one of the first-seventh aspects A1-A7, where the binary waveguide region includes a central waveguide corresponding with a unit digit of the symmetrical binary representation, the central waveguide being a first waveguide or a second waveguide and a first binary segment positioned between the central waveguide and the first edge waveguide region. The first binary segment corresponds with one or more secondary digits of the symmetrical binary representation and the first binary segment includes at least one first waveguide, at least one second waveguide, or both at least one first waveguide and at least one second waveguide. The binary photonics lattice also includes a second binary segment positioned between the central waveguide and the second edge waveguide region. The second binary segment corresponds with one or more mirrored secondary digits of the symmetrical binary representation and the second binary segment includes at least one first waveguide, at least one second waveguide, or both at least one first waveguide and at least one second waveguide.

A ninth aspect A9 includes the binary photonics lattice of any one of the first-seventh aspects A1-A7, where the binary waveguide region includes a central waveguide having a modified second waveguide and corresponding with a unit digit of the symmetrical binary representation. The modified second waveguide includes a lower refractive index than the one or more second waveguides and corresponds with a digit 1 of the symmetrical binary representation. The binary photonics lattice also includes a first binary segment positioned between the central waveguide and the first edge waveguide region. The first binary segment corresponds with one or more secondary digits of the symmetrical binary representation and the first binary segment includes at least one first waveguide, at least one second waveguide, or both at least one first waveguide and at least one second waveguide. The binary photonics lattice also includes a second binary segment positioned between the central waveguide and the second edge waveguide region. The second binary segment corresponds with one or more mirrored secondary digits of the symmetrical binary representation and the second binary segment includes at least one first waveguide, at least one second waveguide, or both at least one first waveguide and at least one second waveguide.

A tenth aspect A10 includes the binary photonics lattice of the ninth aspect A9, where the difference in refractive index between the modified second waveguide and a second waveguide is less than the difference in refractive index between the modified second waveguide and a first waveguide.

An eleventh aspect A11 includes the binary photonics lattice of any one of the first-tenth aspects A1-A10, where $$V_1 = (2\pi a_1)\left(\frac{NA_1}{\lambda}\right),$$

where $$NA_1 = \left(n_{WG1}^2 - n_{CLAD}^2\right)^{\frac{1}{2}},$$

$n_{WG1}$ is the refractive index of the one or more first waveguides, $n_{CLAD}$ is the refractive index of the substrate, $a_1$ is a radius of the one or more first waveguides, and $\lambda$ is the wavelength of one or more photons propagating along the one or more first waveguides and $$V_2 = (2\pi a_2)\left(\frac{NA_2}{\lambda}\right)$$

where $$NA_2 = \left(n_{WG2}^2 - n_{CLAD}^2\right)^{\frac{1}{2}},$$

$n_{WG2}$ is the refractive index of the one or more second waveguides, $n_{CLAD}$ is the refractive index of the substrate, $a_2$ is a radius of the one or more second waveguides, and $\lambda$ is the wavelength of one or more photons propagating along the plurality of single mode waveguides.

A twelfth aspect A12 includes the binary photonics lattice of the eleventh aspect A11, where the one or more first waveguides each have a smaller refractive index than the one or more second waveguides.

A thirteenth aspect A13 includes the binary photonics lattice of the eleventh aspect A11 or the twelfth aspect A12, where the one or more first waveguides each have a smaller diameter than the one or more second waveguides.

A fourteenth aspect A14 includes the binary photonics lattice of any one of the first-thirteenth aspects A1-A13, where the plurality of single mode waveguides are uniformed spaced in the linear distribution and a spacing distance between each adjacent pair of waveguides in the plurality of single mode waveguides is about 30 µm or less.

In a fifteenth aspect A15, an optical system includes the binary photonics lattice of any of the previous aspects and a photon source optically coupled to an input end of a central waveguide of the binary waveguide region.

A sixteenth aspect A16 includes the optical system of the fifteenth aspect A15, further including one or more photon detectors optically coupled to an output end of at least one waveguide of the plurality of single mode waveguides.

A seventeenth aspect A17 includes the optical system of the sixteenth aspect A16, where an output end of each waveguide of the waveguide array is optically coupled to one of the one or more photon detectors.

An eighteenth aspect A18 includes the optical system of the fifteenth aspect A15, further including a plurality of photon pathways each optically coupled to an output end of an individual waveguide of the plurality of single mode waveguides such that the binary photonics lattice is a beam splitter In a nineteenth aspect A19, a method of optically representing a binary number includes directing a plurality of photons generated using a photon source into an input end of a central waveguide of a binary waveguide region of a waveguide array of a binary photonics lattice. The waveguide array includes a plurality of single mode waveguides disposed in a substrate, the plurality of single mode waveguides including one or more first waveguides with a first V-number $V_1$ and one or more second waveguides with a second V-number $V_2$. The first V-number $V_1$ is smaller than the second V-number $V_2$. The one or more first waveguides and the one or more second waveguides are arranged in a linear distribution having the binary waveguide region, a first edge waveguide region, and a second edge waveguide region. The binary waveguide region is positioned between the first edge waveguide region and the second edge waveguide region. The binary waveguide region includes a symmetrical binary representation of a decimal number. Further, the binary waveguide region includes at least one first waveguide representing a digit 0 of the symmetrical binary representation, at least one second waveguide representing a digit 1 of the symmetrical binary representation, or both at least one first waveguide representing a digit 0 of the symmetrical binary representation and at least one second waveguide representing a digit 1 of the symmetrical binary representation. The method of optically representing a binary number also includes receiving the plurality of photons using one or more photon detectors, where each of the one or more photon detectors is optically coupled to an output end of at least one of the plurality of single mode waveguides and measuring an output power distribution based on the plurality of photons received by the one or more photon detectors, where the output power distribution corresponds with the symmetrical binary representation of the decimal number.

A twentieth aspect A20 includes the method of the nineteenth aspect A19, further including determining the binary number and the decimal number that each correspond with the symmetrical binary representation of the output power distribution.

A twenty-first aspect A21 includes the method of the nineteenth aspect A19 or the twentieth aspect A20, where the decimal number is two or greater.

A twenty-second aspect A22 includes the method of any one of the eighteenth-twenty-first aspects A18-A21, where the decimal number is four or greater.

A twenty-third aspect A23 includes the method of any one of the eighteenth-twenty-second aspects A18-A22, where the decimal number is eight or greater.

A twenty-fourth aspect A24 includes the method of any one of the eighteenth-twenty-third aspects A18-A23, where each waveguide of the first edge waveguide region and the second edge waveguide region are a first waveguide and the first edge waveguide region and the second edge waveguide region each have the same number of waveguides.

A twenty-fifth aspect A25 includes the method of any one of the eighteenth-twenty-fourth aspects A18-A24, where the binary waveguide region includes the central waveguide, which corresponds with a unit digit of the symmetrical binary representation and is a first waveguide or a second waveguide and a first binary segment positioned between the central waveguide and the first edge waveguide region. The first binary segment corresponds with one or more secondary digits of the symmetrical binary representation. The first binary segment includes at least one first waveguide, at least one second waveguide, or both at least one first waveguide and at least one second waveguide. The binary waveguide region further includes a second binary segment positioned between the central waveguide and the second edge waveguide region. The second binary segment corresponds with one or more mirrored secondary digits of the symmetrical binary representation and the second binary segment includes at least one first waveguide, at least one second waveguide, or both at least one first waveguide and at least one second waveguide.

A twenty-sixth aspect A26 includes the method of any one of the eighteenth-twenty-fifth aspects A18-A25, where $$V_1 = (2\pi a_1)\left(\frac{NA_1}{\lambda}\right),$$

where $$NA_1 = (n_{WG1}^2 - n_{CLAD}^2)^{\frac{1}{2}},$$

$n_{WG1}$ is the refractive index of the one or more first waveguides, $n_{CLAD}$ is the refractive index of the substrate, $a_1$ is a radius of the one or more first waveguides, and $\lambda$ is the wavelength of one or more photons propagating along the one or more first waveguides and $$V_2 = (2\pi a_2)\left(\frac{NA_2}{\lambda}\right)$$

where $$NA_2 = (n_{WG2}^2 - n_{CLAD}^2)^{\frac{1}{2}},$$

$n_{WG2}$ is the refractive index of the one or more second waveguides, $n_{CLAD}$ is the refractive index of the substrate, $a_2$ is a radius of the one or more second waveguides, and $\lambda$ is the wavelength of one or more photons propagating along the plurality of single mode waveguides.

These and additional features provided by the embodiments described herein will be more fully understood in view of the following detailed description, in conjunction with the drawings.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 2A schematically depicts an example binary photonics lattice comprising a waveguide array having a plurality of single mode waveguides and including a binary waveguide region corresponding with a symmetrical binary representation of the number 0, according to one or more embodiments shown and described herein;

FIG. 2B schematically depicts an example binary photonics lattice comprising a waveguide array having a plurality of single mode waveguides and including a binary waveguide region corresponding with a symmetrical binary representation of the number 1, according to one or more embodiments shown and described herein;

FIG. 2C schematically depicts an example binary photonics lattice comprising a waveguide array having a plurality of single mode waveguides and including a binary waveguide region corresponding with a symmetrical binary representation of the number 2, according to one or more embodiments shown and described herein;

FIG. 2D schematically depicts an example binary photonics lattice comprising a waveguide array having a plurality of single mode waveguides and including a binary waveguide region corresponding with a binary representation of the number 3, according to one or more embodiments shown and described herein;

FIG. 2E schematically depicts an example binary photonics lattice comprising a waveguide array having a plurality of single mode waveguides and including a binary waveguide region corresponding with a symmetrical binary representation of the number 4, according to one or more embodiments shown and described herein;

FIG. 2F schematically depicts an example binary photonics lattice comprising a waveguide array having a plurality of single mode waveguides and including a binary waveguide region corresponding with a symmetrical binary representation of the number 5, according to one or more embodiments shown and described herein;

FIG. 2G schematically depicts an example binary photonics lattice comprising a waveguide array having a plurality of single mode waveguides and including a binary waveguide region corresponding with a symmetrical binary representation of the number 6, according to one or more embodiments shown and described herein;

FIG. 2H schematically depicts an example binary photonics lattice comprising a waveguide array having a plurality of single mode waveguides and including a binary waveguide region corresponding with a symmetrical binary representation of the number 7, according to one or more embodiments shown and described herein;

FIG. 3A-1 is a schematic top view of light propagation from an input end to an output end of the binary photonics lattice of FIG. 2B, according to one or more embodiments shown and described herein;

FIG. 3A-2 graphically depicts the output power distribution of the light propagation of FIG. 3A-1, according to one or more embodiments shown and described herein;

FIG. 3B-1 is a schematic top view of light propagation from an input end to an output end of the binary photonics lattice of FIG. 2C, according to one or more embodiments shown and described herein;

FIG. 3B-2 graphically depicts the output power distribution of the light propagation of FIG. 3B-1, according to one or more embodiments shown and described herein;

FIG. 3C-1 is a schematic top view of light propagation from an input end to an output end of the binary photonics lattice of FIG. 2D, according to one or more embodiments shown and described herein;

FIG. 3C-2 graphically depicts the output power distribution of the light propagation of FIG. 3C-1, according to one or more embodiments shown and described herein;

FIG. 3D-1 is a schematic top view of light propagation from an input end to an output end of the binary photonics lattice of FIG. 2E, according to one or more embodiments shown and described herein;

FIG. 3D-2 graphically depicts the output power distribution of the light propagation of FIG. 3D-1, according to one or more embodiments shown and described herein;

FIG. 3E-1 is a schematic top view of light propagation from an input end to an output end of the binary photonics lattice of FIG. 2F, according to one or more embodiments shown and described herein;

FIG. 3E-2 graphically depicts the output power distribution of the light propagation of FIG. 3E-1, according to one or more embodiments shown and described herein;

FIG. 3F-1 is a schematic top view of light propagation from an input end to an output end of the binary photonics lattice of FIG. 2G, according to one or more embodiments shown and described herein;

FIG. 3F-2 graphically depicts the output power distribution of the light propagation of FIG. 3F-1, according to one or more embodiments shown and described herein;

FIG. 3G-1 is a schematic top view of light propagation from an input end to an output end of the binary photonics lattice of FIG. 2H, according to one or more embodiments shown and described herein; and FIG. 3G-2 graphically depicts the output power distribution of the light propagation of FIG. 3G-1, according to one or more embodiments shown and described herein.

DETAILED DESCRIPTION

Figure 1:
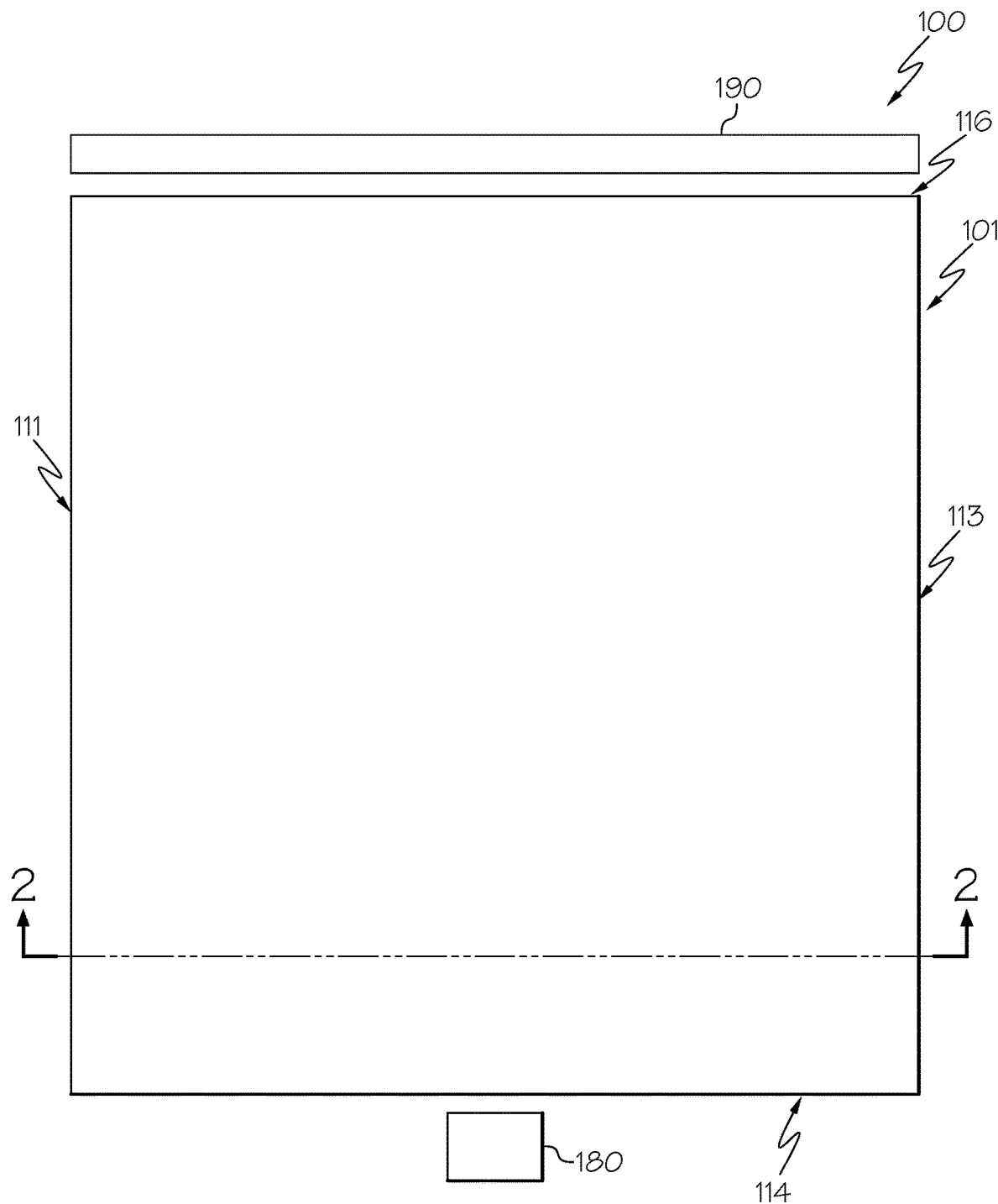
FIG. 1 schematically depicts an optical system including a photon source, a binary photonics lattice, and a photon detector, according to one or more embodiments shown and described herein.

Referring generally to the figures, embodiments of the present disclosure are directed to optical systems that include a binary photonics lattice designed to perform optical representation of binaries. The binary photonics lattice comprises a waveguide array having a plurality of single mode waveguides. The plurality of single mode waveguides include one or more first waveguides having a first V-number and one or more second waveguides having a second V-number. The one or more first waveguides and the one or more second waveguides are arranged in a linear distribution that includes a binary waveguide region positioned between first and second edge waveguide regions, where the binary waveguide region comprises a symmetrical binary representation of a decimal number. In particular, the binary waveguide region may include one or more first waveguides, or more second waveguides, or both, each first waveguide representing a digit 0 of the symmetrical binary representation and each second waveguide representing a digit 1 of the symmetrical binary representation. Further, the optical system includes a photon source optically coupled to a central waveguide of the binary waveguide region and one or more photon detectors optically coupled to one or more of the plurality of single mode waveguides at an output end of the binary photonics lattice.

In operation, a plurality of photons may be directed from the photon source into a central waveguide of the binary waveguide region at an input end of the binary photonics lattice. The plurality of photons enter the central waveguide and propagate from the input end of the binary photonics lattice to an output end of the binary photonics lattice. During propagation, the photons may undergo evanescent coupling between adjacent waveguides such that the plurality of photons exit the output end of the binary photonics lattice from a variety of different waveguides are received using one or more photon detectors optically coupled to the binary photonics lattice. The received photons may be measured to determine an output power distribution, which corresponds to the symmetrical binary representation of the binary waveguide region. This output power distribution is an optical representation of a binary and communicates a binary number (and thereby a corresponding decimal number) to the one or more photon detectors. The binary photonics lattices of the present disclosure are programmable and controllable and may be manufactured as integrated photonics on-chip using current technologies, such as laser writing. Furthermore, the binary photonics lattices provide a building block for the development of on-chip, all-optical binary components for optical digital computing that may operate at low power and do not rely on optical nonlinearity. Embodiments of binary photonics lattices and optical systems comprising binary photonics lattices will now be described and, whenever possible, the same reference numerals will be used throughout the drawings to refer to the same or like parts.

Referring now to FIGS. 1 and 2A-2H, an optical system 100 (FIG. 1) comprising a binary photonics lattice 101 is depicted. The binary photonics lattice 101 comprises a plurality of single mode waveguides 110 (FIGS. 2A-2H). In some embodiments, the plurality of single mode waveguides 110 of the binary photonics lattice 101 are disposed in a substrate 105, which may be a cladding. In some embodiments, the plurality of single mode waveguides 110 are laser written waveguides and in some embodiments, the plurality of single mode waveguides 110 are lithography etched, for example, lithography etched Si-waveguides. In some embodiments, the plurality of single mode waveguides 110 are formed using an ion-exchange method for fabricating waveguides. The plurality of single mode waveguides 110 include one or more first waveguides 120 and/or one or more second waveguides 130 disposed in a linear distribution 140. Both the one or more first waveguides 120 and the one or more second waveguides 130 are single mode waveguides.

In addition, the optical system 100 comprises one or more photon sources 180 optically coupled to an input end 114 of at least one of the plurality of single mode waveguides 110. In some embodiments, the optical system 100 further comprises one or more photon detectors 190 optically coupled to an output end 116 of at least one of the plurality of single mode waveguides 110. For example, in some embodiments, at least one photon detector of the one or more photon detectors 190 is optically coupled to the output end 116 of the plurality of single mode waveguides 110. In other embodiments, the optical system 100 comprises a plurality of photon pathways, such as a plurality of optical fibers, each optically coupled to the output end 116 of an individual waveguide of the plurality of single mode waveguides 110 such that the binary photonics lattice 101 may operate as a beam splitter. Moreover, in each of these embodiments, the optical system 100 may be an integrated optical device embedded on a single chip.

In operation, the optical system 100 may be used to perform an optical representation of a binary by directing a plurality of photons generated using the photon source 180 into the input end 114 of an individual waveguide (such as a central waveguide 151) of the binary photonics lattice 101, receiving the plurality of photons using one or more photon detectors 190, and measuring an output power distribution of the plurality of photons received by the one or more photon detectors 190. The photon source 180 may comprise coherent light source such that the plurality of photons comprises a coherent beam of light having a wavelength of, for example, 1550 nm. The output power distribution is the relative number of photons of the plurality of photons that exit each individual waveguide of the plurality of single mode waveguides 110. The output power distribution also represents the relative distribution of power output from the output end 116 of the plurality of single mode waveguides 110. While not intending to be limited by theory, when a statistically significant number to photons are directed into an individual waveguide of the binary photonics lattice 101, the output power distribution corresponds with a photon probability distribution, which is a distribution function that represents the probability of a photon that is directed into the input end 114 of the binary photonics lattice 101 exiting the output end 116 of an individual waveguide of the plurality of single mode waveguides 110 of the binary photonics lattice 101.

Referring now to FIGS. 2A-2H, a number of different versions of the binary photonics lattice 101 of FIG. 1 are depicted. Indeed, FIGS. 2A-2H each schematically depict a cross section of the binary photonics lattice 101 of FIG. 1 along line 2-2 and each of FIGS. 2A-2H depict a binary photonics lattice 101 configured to generate an optical representation of a different binary number, which each correspond with a different decimal number. In particular, the plurality of single mode waveguides 110 of each binary photonics lattice 101 are arranged in a linear distribution 140 that includes a first edge waveguide region 142, a second edge waveguide region 144, and a binary waveguide region 150 positioned between the first edge waveguide region 142 and the second edge waveguide region 144.

Each binary photonics lattice 101 depicted in FIGS. 2A-2H (i.e., binary photonics lattices 101a-101h) comprise a unique binary waveguide region 150 (i.e., binary waveguide regions 150a-150f) that comprises one or more first waveguides 120, one or more second waveguides 130, or a combination of first waveguides 120 and second waveguides 130. Furthermore, the one or more first waveguides 120 comprise a first V-number and the one or more second waveguides 130 comprise a second V-number. The first V-number is smaller than the second V-number. Referring still to FIGS. 2A-2H, each binary waveguide region 150a-150f is a symmetrical binary representation of a different binary number and thereby a different decimal number. In some embodiments, the binary waveguide region 150 may be a symmetrical binary representation of a decimal number of two or greater, three or greater, four or greater, five or greater, six or greater, seven or greater, eight or greater, nine or greater, ten or greater, or the like. Indeed, it should be understood that in the embodiments described herein, the binary waveguide region 150 may be a symmetrical binary representation of any decimal number.

In the binary waveguide regions 150a-150f, each first waveguide 120 represents a digit 0 of the symmetrical binary representation and each second waveguide 130 represents a digit 1 of the symmetrical binary representation. As used herein, a "symmetrical binary representation" is a representation of a binary number in which a unit digit of the binary number is the central digit of the symmetrical binary representation, and in which any secondary digits of the binary number beyond the unit digit are represented by a first set of digits that extend in one direction from the central digit and a mirrored version of these secondary digits of the binary number are represented by a second set of digits that extend in an opposite direction from the central digit. As a non-limiting example, conventionally, the binary of the decimal number 5 is 101 such that the unit digit (and thereby the central digit in the symmetrical binary representation) is 1, the secondary digits of the binary number are 10, and the mirrored version of the secondary digits are 01. Thus, the symmetrical binary representation of the decimal number 5 is 10101, where the unit digit 1 is also the central digit.

Referring still to FIGS. 2A-2H, each binary waveguide region 150 includes a central waveguide 151 corresponding with the unit digit of the symmetrical binary representation. In embodiments of the binary photonics lattice 101 where the binary waveguide region 150 is a symmetrical binary representation of a decimal number of two or greater (FIGS. 2C-2H), the binary waveguide region 150 also includes a first binary segment 152 corresponding with one or more secondary digits of the symmetrical binary representation, and a second binary segment 154 corresponding with one or more mirrored secondary digits of the symmetrical binary representation. When the unit digit of the symmetrical binary representation is a digit 0, the central waveguide 151 comprises a first waveguide 120 and when the unit digit of the symmetrical binary representation is a digit 1, the central waveguide 151 comprises a second waveguide 130. Each secondary digit of the symmetrical binary representation that is a digit 0 corresponds a first waveguide 120 in the first binary segment 152 and each secondary digit of the symmetrical binary representation that is a digit 1 corresponds a second waveguide 130 in the first binary segment 152. Similarly, each mirrored secondary digit of the symmetrical binary representation that is a digit 0 corresponds a first waveguide 120 in the second binary segment 154 and each mirrored secondary digit of the symmetrical binary representation that is a digit 1 corresponds a second waveguide 130 in the second binary segment 154. Furthermore, the first binary segment 152 is positioned between the central waveguide 151 and the first edge waveguide region 142 and the second binary segment 154 is positioned between the central waveguide 151 and the second edge waveguide region 144. Without intending to be limited by theory, by arranging the binary waveguide region 150 in a symmetrical binary representation and includes the first edge waveguide region 142 and the second edge waveguide region 144, propagation disorder is minimized. In particular, if the waveguide representing the unit digit of a binary number was positioned at an edge of the waveguide array (similar to the rightward most location of the unit digit in a typical numerical binary representation) causes strong disorder at this input waveguide and the output power distribution may not resemble the binary structures.

In the embodiments described herein, the first edge waveguide region 142 and the second edge waveguide region 144 each comprise a plurality of first waveguides 120 and thus each correspond to a digit 0 of a symmetrical binary representation. In some embodiments, the first edge waveguide region 142 and the second edge waveguide region 144 each comprise the same number of waveguides. In addition, in some embodiments, both the first edge waveguide region 142 and the second edge waveguide region 144 comprise a greater number of total waveguides than the binary waveguide region 150. However, while not intending to be limited by theory, in embodiments in which the binary waveguide region 150 is a symmetrical binary representation of a large binary number, both the first edge waveguide region 142 and the second edge waveguide region 144 comprise a lesser number of total waveguides than the binary waveguide region 150.

While still not intending to be limited by theory, increasing the total number of waveguides in the first edge waveguide region 142 and the second edge waveguide region 144 increases the similarity between the section of the output power distribution aligned with the binary waveguide region 150 and an ideal symmetrical binary representation of the binary waveguide region 150. While still not intending to be limited by theory, when light is propagating through the binary photonics lattice 101, some interference occurs between the more outer waveguides (such as the waveguides in the first edge waveguide region 142 and the second edge waveguide region 144) and the more central waveguides (such as the waveguides in the binary waveguide region 150). As the total number of waveguides increases (i.e., by increasing the number of waveguides in the first edge waveguide region 142 and the second edge waveguide region 144) interference between the more outer waveguides and the more central waveguides decreases, improving the output power distribution. As an example, to minimize interference, the binary photonics lattice may be 29 or more waveguides in embodiments representing binaries of up to 4, 49 or more waveguides in embodiments representing binaries up to 8, and 69 or more waveguides for binaries up to 16. Moreover, without intending to be limited by theory, to represent binaries up to up to $2^{64}$, the binary photonics lattice 101 would comprise about 1300 waveguides. It should be understood that the total number of waveguides in the binary photonics lattice may differ in different situations, for example, due to materials, wavelength of operation, or the like.

Furthermore, in some embodiments, the central waveguide 151 of the binary waveguide region 150 comprises a modified second waveguide. The modified second waveguide comprises a lower refractive index than the one or more second waveguides 130 but still corresponds with a digit 1 of the symmetrical binary representation. Moreover, the difference in refractive index between the modified second waveguide and the second waveguide is less than the difference in refractive index between the modified second waveguide and the first waveguide. While note intending to be limited by theory, in embodiments, in which the binary waveguide region 150 corresponds with a symmetrical binary representation having multiple digit is and the unit digit is a digit 1 and each digit 1 is represented by the second waveguide 130, then the uniformity of the power distribution in the section of the output power distribution aligned with the binary waveguide region 150 is diminished. However, while still not intending to be limited by theory, when the central waveguide 151 is a modified second waveguide, and thus has a slightly lower refractive index than the second waveguides 130, the similarity between the section of the output power distribution aligned with the binary waveguide region 150 and an ideal symmetrical binary representation of the binary waveguide region 150 is improved. In other words, the modified second waveguide improves uniformity of the power distribution in the section of the output power distribution aligned with the binary waveguide region 150.

As noted above, each first waveguide 120 comprises a first V-number and each second waveguide 130 comprises a second V-number. The first V-number is less than the second V-number and this V-number difference provides the unique output power distribution generated by each binary photonics lattice 101a-101h. Without intending to be limited by theory, in a single-mode regime, waveguides having a lower V-number have lower overlap between light beam and the waveguide core and therefore light confinement is weaker than in waveguides having a higher V-number. The V-number $$V = (2\pi a)\left(\frac{NA}{\lambda}\right),$$

$$NA = (n_{WG} - n_{CLAD})^{\frac{1}{2}},$$

$n_{WG}$ is the refractive index of an individual waveguide of the plurality of single mode waveguides 110, $n_{CLAD}$ is the refractive index of the substrate 105, $a_1$ is a radius of an individual waveguide of the plurality of single mode waveguides 110, and $\lambda$ is the wavelength of one or more photons propagating along the plurality of single mode waveguides 110. In particular, the first V-number $$V_1 = (2\pi a_1)\left(\frac{NA_1}{\lambda}\right),$$

where $$NA_1 = \left(n_{WG1}^2 - n_{CLAD}^2\right)^{\frac{1}{2}},$$

$n_{WG1}$ is the refractive index of the one or more first waveguides 120, $n_{CLAD}$ is the refractive index of the substrate 105, $a_1$ is a radius of the one or more first waveguides 120, and $\lambda$ is the wavelength of one or more photons propagating along the plurality of single mode waveguides 110 and the second V-number $$V_2 = (2\pi a_2)\left(\frac{NA_2}{\lambda}\right)$$

where $$NA_2 = \left(n_{WG2}^2 - n_{CLAD}^2\right)^{\frac{1}{2}},$$

$n_{WG2}$ is the refractive index of the one or more second waveguides 130, $n_{CLAD}$ is the refractive index of the substrate 105, $a_2$ is a radius of the one or more second waveguides 130, and λ is the wavelength of one or more photons propagating along the plurality of single mode waveguides 110. Moreover, as the one or more first waveguides 120 and the one or more second waveguides 130 are single mode waveguides, the first V-number $V_1$ and the second V-number $V_2$ are less than 2.405.

As shown mathematically by the V-number, two waveguides that comprise different refractive indices may comprise different V-numbers and two waveguides that comprise different diameters may comprise different V-numbers. For example, the one or more first waveguides 120 comprise a first diameter and a first refractive index and the one or more second waveguides 130 comprise a second diameter and a second refractive index. To achieve differing V-numbers, the first diameter may be different than the second diameter, the first refractive index may be different than the second refractive index, or both. In the embodiments described herein, the first waveguides 120 comprises a lower refractive index and/or a smaller diameter than the second waveguides 130 and thus the first waveguides 120, which represent the digit 0 of a binary number, have a smaller V-number and thus a weaker light confinement than the second waveguides 130, which represent the digit 1 of a binary number. Accordingly, light conferment in the second waveguides 130 is stronger than light confinement in the first waveguides 120.

Moreover, while not intending to be limited by theory, fields of the waves (e.g., light waves) propagating in the binary photonics lattice 101 of first and second waveguides 120, 130 may be coupled and the binary photonics lattice 101 may comprise a first coupling coefficient $\kappa_{12}$ (i.e. the coupling coefficient for coupling from a second waveguide 130 to a first waveguide 120) and a second coupling coefficient $\kappa_{21}$ (i.e., the coupling coefficient for coupling from a first waveguide 120 to a second waveguide 130), which represent the amount of couplings between the fields in the two waveguides. In other words, coupling coefficients measure the amount of overlap between the modal fields $\psi_1(x, y)$ and $\psi_2(x, y)$ in a first waveguide 120 and a second waveguide 130, respectively. Thus, each coupling coefficient κ is governed by an overlap integral, which indicates the behavior of the coupling between the modal fields resulting in a transfer of energy from one waveguide to the other. Further, the first coupling coefficient $\kappa_{12}$ is different than the second coupling coefficient $\kappa_{21}$. In general, the modal fields in waveguides $\psi_1(x, y)$ and $\psi_2(x, y)$ depend on various parameters such as the widths (e.g., diameters) of the waveguides, the refractive indices of the waveguides $n_1(x, y)$, $n_2(x, y)$, the material of the substrate 105, and the wavelength of operation (λ). While not intending to be limited by theory, the coupling coefficients $\kappa_{12}$ and $\kappa_{21}$ may be mathematically represented by $$\kappa_{12} = \frac{k_0^2}{2\beta_1} \frac{\iint_{-\infty}^{\infty} \psi_1^* \Delta n_1^2 \psi_2 \, dx \, dy}{\iint_{-\infty}^{\infty} \psi_1^* \psi_1 \, dx \, dy}$$

and $$\kappa_{21} = \frac{k_0^2}{2\beta_2} \frac{\iint_{-\infty}^{\infty} \psi_2^* \Delta n_2^2 \psi_1 \, dx \, dy}{\iint_{-\infty}^{\infty} \psi_2^* \psi_2 \, dx \, dy}$$

where $\beta_1$ is the propagation constant of the first waveguide 120, $\beta_2$ is the propagation constant of the second waveguide 130, $$k_0 = \frac{2\pi}{\lambda},$$

$$\Delta n_1^2 = n_T^2 - n_2^2,$$

and $\Delta n_2^2 = n_T^2 - n_1^2$, and where $n_T(x, y)$ is the index profile of a two waveguide portion of the waveguide array 110 that comprises an individual first waveguide 120 adjacent an individual second waveguide 130.

As depicted in FIGS. 2A-2H, adjacent waveguides of the plurality of single mode waveguides 110 disposed in the linear distribution 140 are spaced apart from one another by a spacing distance D. While not intending to be limited by theory, when performing an optical representation of a binary number, each photon propagates through the binary photonics lattice 101, moving between adjacent waveguides via evanescent coupling while propagating from the input end 114 of the binary photonics lattice 101 to the output end 116 of the binary photonics lattice 101. Thus, the spacing distance D between adjacent waveguides is close enough for evanescent coupling to occur, for example, the spacing distance D may comprise about 30 μm or less, for example, about 25 μm or less, about 20 μm or less, about 15 μm or less, about 10 μm or less, such as 8 μm, about 5 μm or less, or the like. Further, in some embodiments, adjacent waveguides of the waveguide array 110 may be uniformly spaced in the linear distribution 140. Moreover, the resultant distribution of photons once these photons propagate from the input end 114 to the output end 116 of the binary photonics lattice 101 is the output power distribution. Without intending to be limited by theory, the differences between the first waveguides 120 and the second waveguides 130 break periodicity of the binary photonics lattice 101, create localizations of light propagating in the binary photonics lattice 101 and the particular arrangement of first waveguides 120 and second waveguides 130 in the binary waveguide region 150 of the binary photonics lattice causes particular output power distributions. Specific example binary photonics lattices 101 and their respective output power distributions will now be described.

Referring now to FIG. 2A, a binary photonics lattice 101a is schematically depicted that comprises a waveguide array 110a having a binary waveguide region 150a corresponding with a symmetrical binary representations of the decimal number 0. In particular, the binary waveguide region 150a comprises a single first waveguide 120 corresponding with a digit 0 of the symmetrical binary representation. Indeed, the decimal number 0 converts to the binary number 0 and thus the symmetrical binary representation of the decimal number 0 is 0.

Figures 2, 3A:
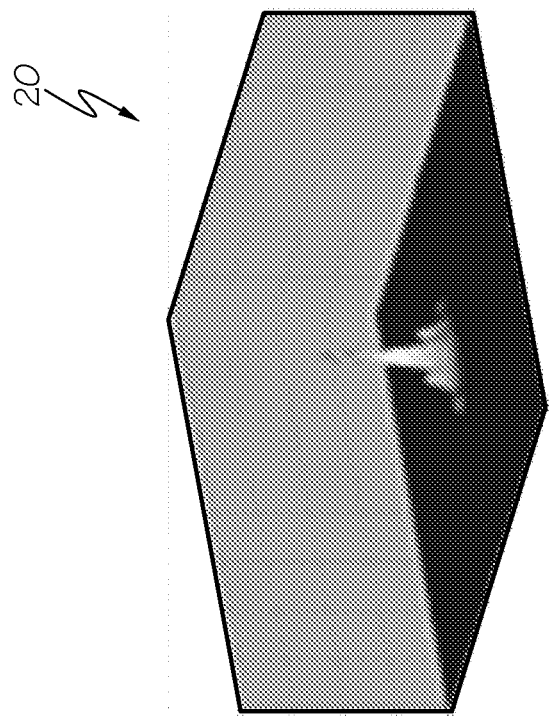
Figures 1, 3A:
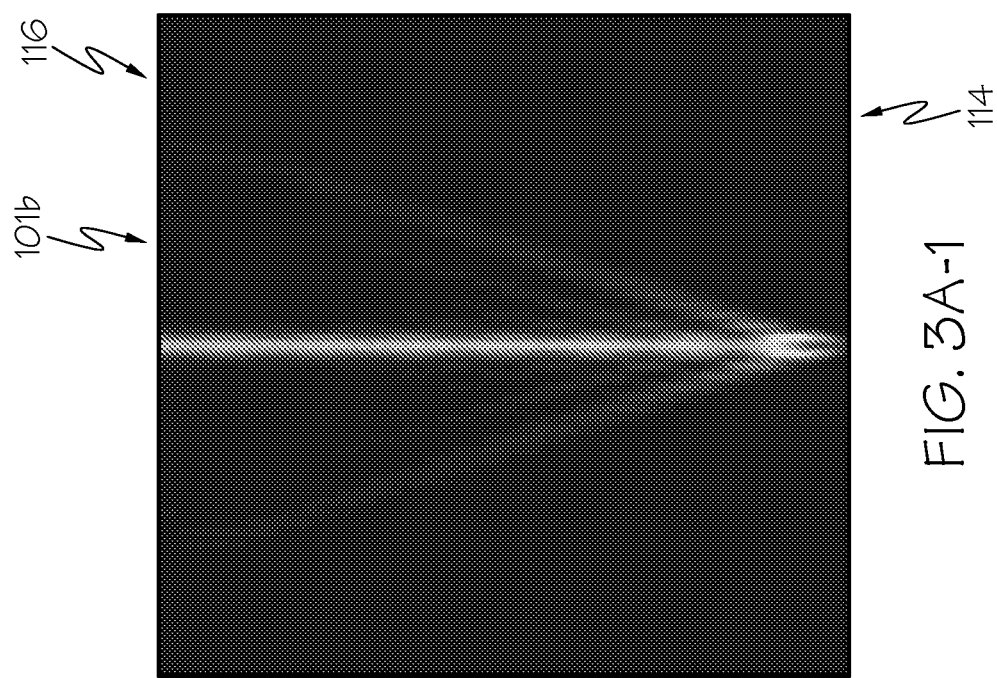

Referring now to FIG. 2B, a binary photonics lattice 101b is schematically depicted that comprises a waveguide array 110b having a binary waveguide region 150b corresponding with a symmetrical binary representation of the decimal number 1. In particular, the binary waveguide region 150b comprises a single second waveguide 130 corresponding with a digit 1 of the symmetrical binary representation. In particular, the binary waveguide region 150b comprises a central waveguide 151 that is a second waveguide 130 corresponding with a digit 1 of the symmetrical binary representation, a first binary segment 152 comprising a first waveguide 120 corresponding with a digit 0 of the symmetrical binary representation, and a second binary segment 154 comprising a first waveguide 120 corresponding with a digit 0 of the symmetrical binary representation. Indeed, the decimal number 1 converts to the binary number 01 and thus the symmetrical binary representation of the decimal number 1 is 010. In operation, when a plurality of photons are directed into the central waveguide 151 of the binary waveguide region 150b, light propagates from the input end 114 of the binary photonics lattice 101b to the output end 116 of the binary photonics lattice 101b as schematically shown in FIG. 3A-1. Furthermore, the plurality of photons exit the output end 116 of the binary photonics lattice 101b in an output power distribution 20, as graphically depicted in FIG. 3A-2. The output power distribution 20 is a symmetrical binary representation of the binary number 01 and the decimal number 1.

Referring now to FIG. 2C, a binary photonics lattice 101c is schematically depicted that comprises a waveguide array 110c having a binary waveguide region 150c corresponding with a symmetrical binary representation of the decimal number two. In particular, the binary waveguide region 150c comprises a central waveguide 151 that is a first waveguide 120 corresponding with a digit 0 of the symmetrical binary representation, a first binary segment 152 comprising a second waveguide 130 corresponding with a digit 1 of the symmetrical binary representation, and a second binary segment 154 comprising a second waveguide 130 corresponding with a digit 1 of the symmetrical binary representation. Indeed, the decimal number 2 converts to the binary number 10 and thus the symmetrical binary representation of the decimal number 2 is 101. In operation, when a plurality of photons are directed into the central waveguide 151 of the binary waveguide region 150c, light propagates from the input end 114 of the binary photonics lattice 101c to the output end 116 of the binary photonics lattice 101c as schematically shown in FIG. 3B-1. Furthermore, the plurality of photons exit the output end 116 of the binary photonics lattice 101c in an output power distribution 30, as graphically depicted in FIG. 3B-2. The output power distribution 30 is a symmetrical binary representation of the binary number 10 and the decimal number 2.

Figures 2, 3C:
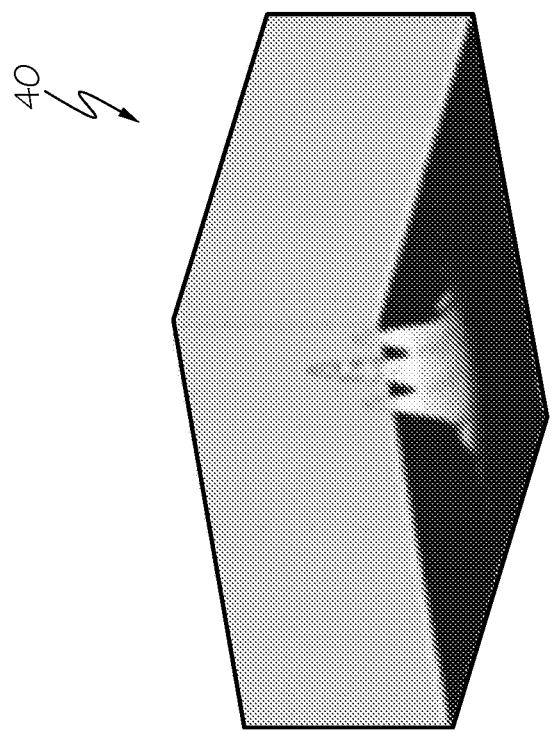
Figures 1, 3C:
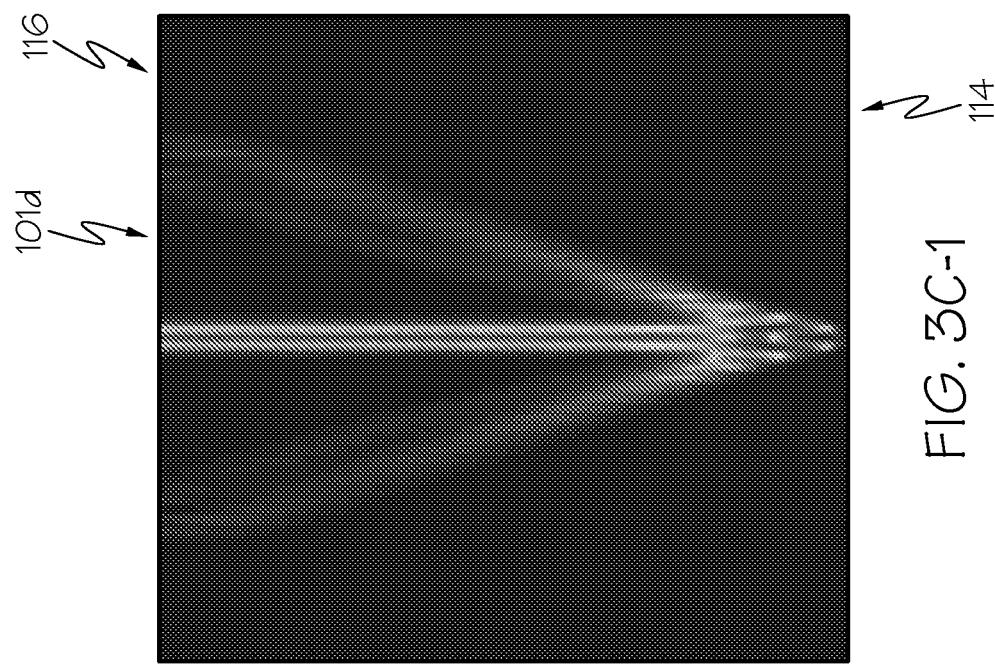

Referring now to FIG. 2D, a binary photonics lattice 101d is schematically depicted that comprises a waveguide array 110d having a binary waveguide region 150d corresponding with a symmetrical binary representation of the decimal number three. In particular, the binary waveguide region 150d comprises a central waveguide 151 that is a second waveguide 130 corresponding with a digit 1 of the symmetrical binary representation, a first binary segment 152 comprising a second waveguide 130 corresponding with a digit 1 of the symmetrical binary representation, and a second binary segment 154 comprising a second waveguide 130 corresponding with a digit 1 of the symmetrical binary representation. Indeed, the decimal number 3 converts to the binary number 11 and thus the symmetrical binary representation of the decimal number 3 is 111. In operation, when a plurality of photons are directed into the central waveguide 151 of the binary waveguide region 150d, light propagates from the input end 114 of the binary photonics lattice 101d to the output end 116 of the binary photonics lattice 101d as schematically shown in FIG. 3C-1. Furthermore, the plurality of photons exit the output end 116 of the binary photonics lattice 101d in an output power distribution 40, as graphically depicted in FIG. 3C-2. The output power distribution 40 is a symmetrical binary representation of the binary number 11 and the decimal number 3.

Figures 2, 3D:
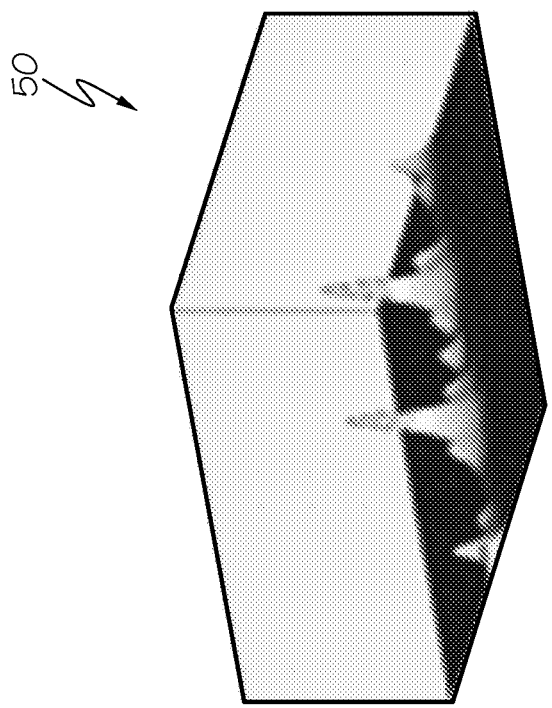
Figures 1, 3D:
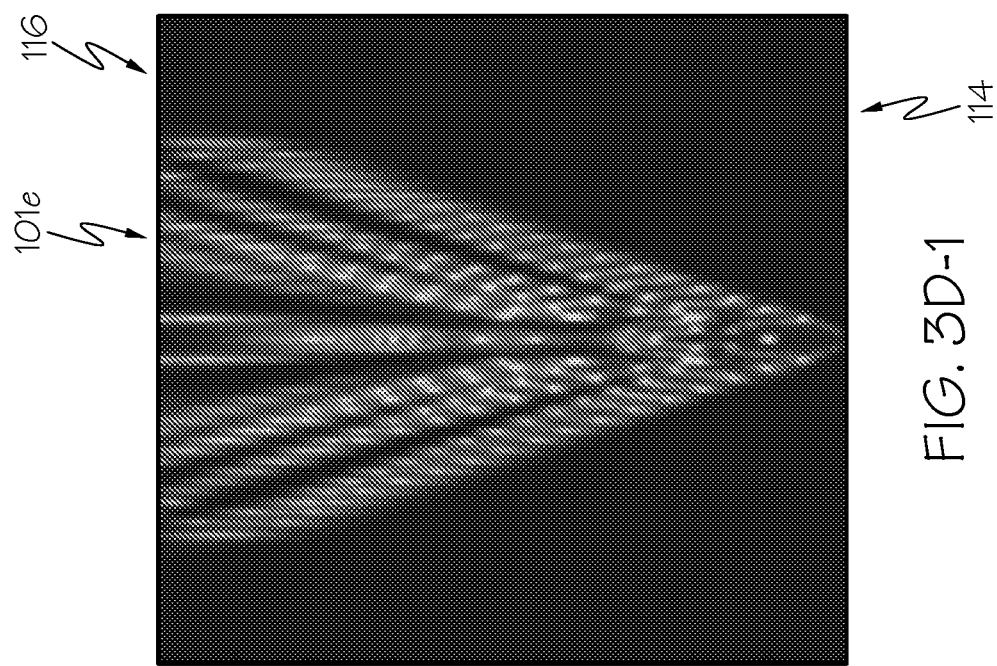

Referring now to FIG. 2E, a binary photonics lattice 101e is schematically depicted that comprises a waveguide array 110e having a binary waveguide region 150e corresponding with a symmetrical binary representation of the decimal number four. The central waveguide 151 of the binary waveguide region 150e is a first waveguide 120 corresponding with a digit 0 of the symmetrical binary representation. The first binary segment 152 of the binary waveguide region 150e comprises a first waveguide 120 corresponding with a digit 0 of the symmetrical binary representation and positioned adjacent to the central waveguide 151 and a second waveguide 130 corresponding with a digit 1 of the symmetrical binary representation positioned adjacent to the first edge waveguide region 142. Furthermore, the second binary segment 154 comprises a first waveguide 120 corresponding with a digit 0 of the symmetrical binary representation and positioned adjacent to the central waveguide 151 and a second waveguide 130 corresponding with a digit 1 of the symmetrical binary representation positioned adjacent to the second edge waveguide region 144. Indeed, the decimal number 4 converts to the binary number 100 and thus the symmetrical binary representation of the decimal number 4 is 10001. In operation, when a plurality of photons are directed into the central waveguide 151 of the binary waveguide region 150e, light propagates from the input end 114 of the binary photonics lattice 101e to the output end 116 of the binary photonics lattice 101e as schematically shown in FIG. 3D-1. Furthermore, the plurality of photons exit the output end 116 of the binary photonics lattice 101e in an output power distribution 50, as graphically depicted in FIG. 3D-2. The output power distribution 50 is a symmetrical binary representation of the binary number 100 and the decimal number 4.

Referring now to FIG. 2F, a binary photonics lattice 101f is schematically depicted that comprises a waveguide array 110f having a binary waveguide region 150f corresponding with a symmetrical binary representation of the decimal number five. The central waveguide 151 of the binary waveguide region 150f is a second waveguide 130 corresponding with a digit 1 of the symmetrical binary representation. The first binary segment 152 of the binary waveguide region 150e comprises a first waveguide 120 corresponding with a digit 0 of the symmetrical binary representation and positioned adjacent to the central waveguide 151 and a second waveguide 130 corresponding with a digit 1 of the symmetrical binary representation positioned adjacent to the first edge waveguide region 142. Furthermore, the second binary segment 154 comprises a first waveguide 120 corresponding with a digit 0 of the symmetrical binary representation and positioned adjacent to the central waveguide 151 and a second waveguide 130 corresponding with a digit 1 of the symmetrical binary representation positioned adjacent to the second edge waveguide region 144. Indeed, the decimal number 5 converts to the binary number 101 and thus the symmetrical binary representation of the decimal number 5 is 10101. In operation, when a plurality of photons are directed into the central waveguide 151 of the binary waveguide region 150f, light propagates from the input end 114 of the binary photonics lattice 101f to the output end 116 of the binary photonics lattice 101f as schematically shown in FIG. 3E-1. Furthermore, the plurality of photons exit the output end 116 of the binary photonics lattice 101f in an output power distribution 60, as graphically depicted in FIG. 3E-2. The output power distribution 60 is a symmetrical binary representation of the binary number 101 and the decimal number 5.

Figures 1, 3F:
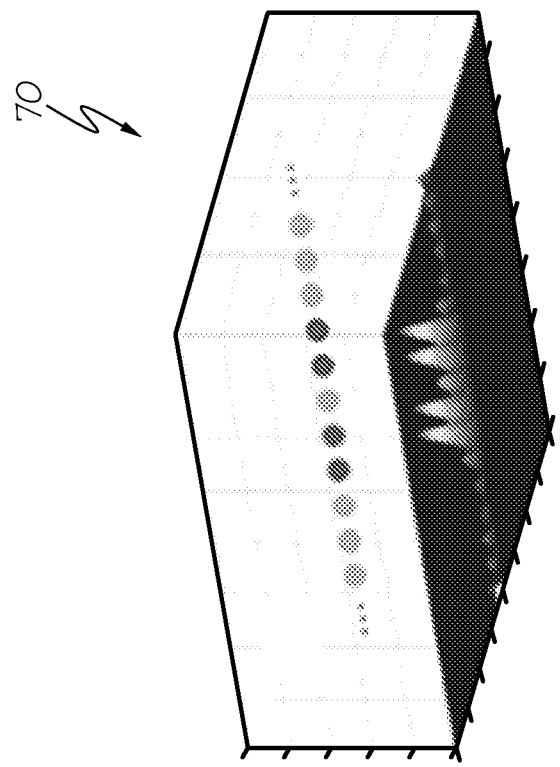
Figures 2, 3F:
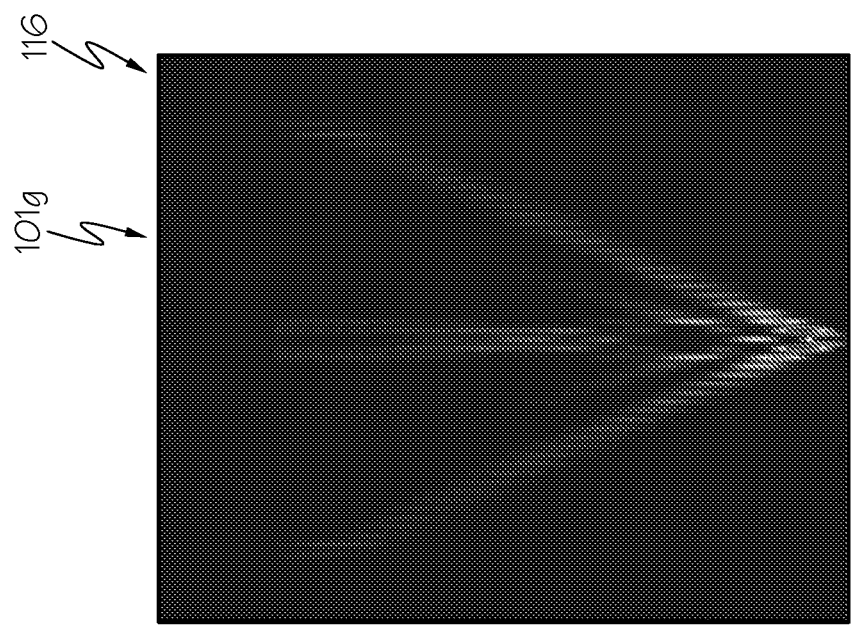

Referring now to FIG. 2G, a binary photonics lattice 101g is schematically depicted that comprises a waveguide array 110g having a binary waveguide region 150g corresponding with a symmetrical binary representation of the decimal number six. The central waveguide 151 of the binary waveguide region 150g is a first waveguide 120 corresponding with a digit 0 of the symmetrical binary representation. The first binary segment 152 of the binary waveguide region 150e comprises a second waveguide 130 corresponding with a digit 1 of the symmetrical binary representation and positioned adjacent to the central waveguide 151 and another second waveguide 130 corresponding with another digit 1 of the symmetrical binary representation positioned adjacent to the first edge waveguide region 142. Furthermore, the second binary segment 154 comprises a second waveguide 130 corresponding with a digit 1 of the symmetrical binary representation and positioned adjacent to the central waveguide 151 and another second waveguide 130 corresponding with another digit 1 of the symmetrical binary representation positioned adjacent to the second edge waveguide region 144. Indeed, the decimal number 6 converts to the binary number 110 and thus the symmetrical binary representation of the decimal number 6 is 11011. In operation, when a plurality of photons are directed into the central waveguide 151 of the binary waveguide region 150g, light propagates from the input end 114 of the binary photonics lattice 101g to the output end 116 of the binary photonics lattice 101g as schematically shown in FIG. 3F-1. Furthermore, the plurality of photons exit the output end 116 of the binary photonics lattice 101g in an output power distribution 70, as graphically depicted in FIG. 3F-2. The output power distribution 70 is a symmetrical binary representation of the binary number 110 and the decimal number 6.

Figures 2, 3G:
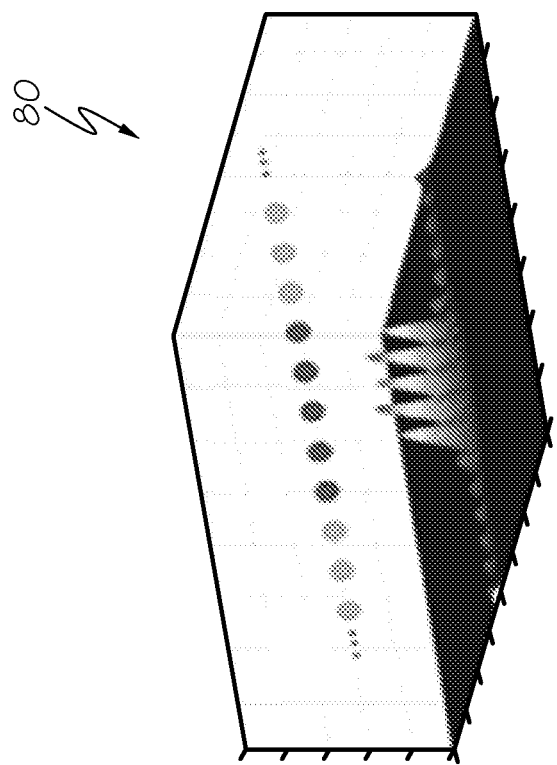
Figures 1, 3G:
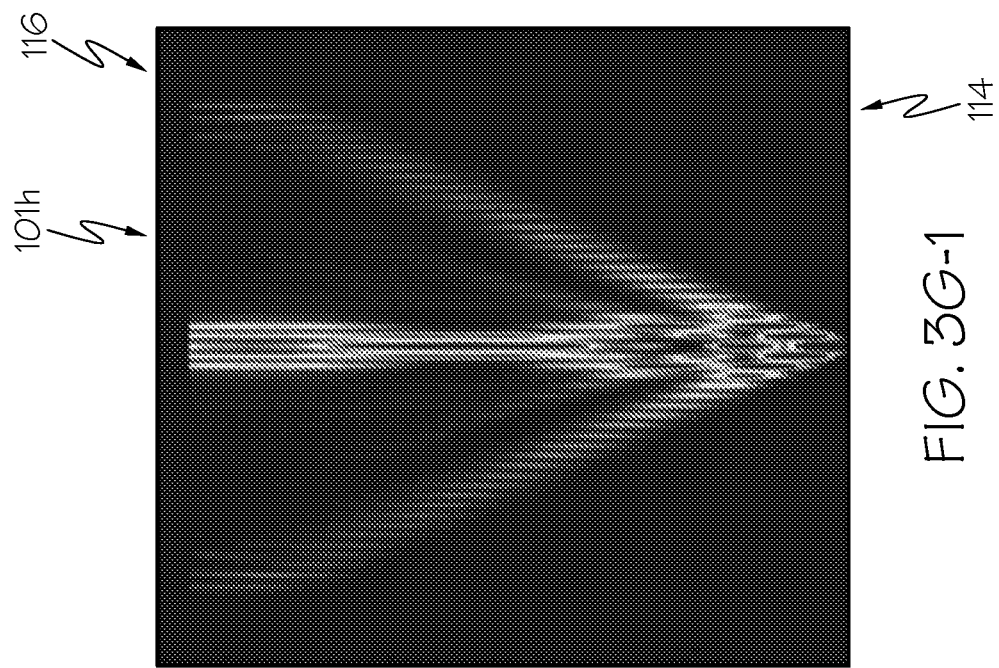

Referring now to FIG. 2H, a binary photonics lattice 101h is schematically depicted that comprises a waveguide array 110h having a binary waveguide region 150h corresponding with a symmetrical binary representation of the decimal number seven. The central waveguide 151 of the binary waveguide region 150g is a second waveguide 130 corresponding with a digit 1 of the symmetrical binary representation. The first binary segment 152 of the binary waveguide region 150e comprises a second waveguide 130 corresponding with a digit 1 of the symmetrical binary representation and positioned adjacent to the central waveguide 151 and another second waveguide 130 corresponding with another digit 1 of the symmetrical binary representation positioned adjacent to the first edge waveguide region 142. Furthermore, the second binary segment 154 comprises a second waveguide 130 corresponding with a digit 1 of the symmetrical binary representation and positioned adjacent to the central waveguide 151 and another second waveguide 130 corresponding with another digit 1 of the symmetrical binary representation positioned adjacent to the second edge waveguide region 144. Indeed, the decimal number 7 converts to the binary number 111 and thus the symmetrical binary representation of the decimal number 7 is 11111. In operation, when a plurality of photons are directed into the central waveguide 151 of the binary waveguide region 150h, light propagates from the input end 114 of the binary photonics lattice 101h to the output end 116 of the binary photonics lattice 101h as schematically shown in FIG. 3G-1. Furthermore, the plurality of photons exit the output end 116 of the binary photonics lattice 101h in an output power distribution 80, as graphically depicted in FIG. 3G-2. The output power distribution 80 is a symmetrical binary representation of the binary number 111 and the decimal number 7.

Referring again to FIG. 1 through FIG. 3G-2, a method of optically representing a binary number using the optical system 100 described herein may comprise directing a plurality of photons generated using the photon source 180 into the input end 114 of the central waveguide 151 of the binary waveguide region 150 of a waveguide array 110 of the binary photonics lattice 101. Once directed into the waveguide array 110, the photons propagate from the input end 114 to the output end 116 and, via evanescent coupling, some of the photons propagate between adjacent waveguides. Next, the method comprises, receiving the plurality of photons using the one or more photon detectors 190 and measuring an output power distribution based on the plurality of photons received by the one or more photon detectors 190. The output power distribution corresponds with the symmetrical binary representation of both a binary number and its corresponding decimal number. In addition, the method further comprises determining the binary number and the decimal number that each correspond with the symmetrical binary representation of the output power distribution using the one or more photon detectors 190 or another computing component optically or otherwise communicatively coupled to the one or more photon detectors 190.

Moreover, while the binary photonics lattice 101 is described herein primarily for use in optically representing binary numbers, in other embodiments, the binary photonics lattice 101 may be useful as an beam splitter, which may be integrated on chip, and may operate to split a single input signal into multiple parts, based on the particular arrangement of waveguides in the binary photonics lattice 101. Conventional beam splitters, such as prisms or directional-couplers, can split a single input signal into two or a few beams. In contrast, the binary photonics lattice can controllably and repeatably split a single input signal into much greater than two beams, which is useful in both classical optical applications and quantum optical applications.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A binary photonics lattice comprising:
   a waveguide array comprising a plurality of single mode waveguides disposed in a substrate, the plurality of single mode waveguides including one or more first waveguides comprising a first V-number $V_1$ and one or more second waveguides comprising a second V-number $V_2$ wherein:
   the first V-number Vis smaller than the second V-number $V_2$;
   the one or more first waveguides and the one or more second waveguides are arranged in a linear distribution comprising a first edge waveguide region, a second edge waveguide region, and a binary waveguide region positioned between the first edge waveguide region and the second edge waveguide region, wherein:
   the binary waveguide region comprises a symmetrical binary representation of a decimal number of two or greater; and
   the binary waveguide region comprises at least one first waveguide representing a digit 0 of the symmetrical binary representation, at least one second waveguide representing a digit 1 of the symmetrical binary representation, or both at least one first waveguide representing a digit 0 of the symmetrical binary representation and at least one second waveguide representing a digit 1 of the symmetrical binary representation.

2. The binary photonics lattice of claim 1, wherein the decimal number is three or greater.

3. The binary photonics lattice of claim 1, wherein the decimal number is four or greater.

4. The binary photonics lattice of claim 1, wherein the decimal number is six or greater.

5. The binary photonics lattice of claim 1, wherein the decimal number is eight or greater.

6. The binary photonics lattice of claim 1, wherein each waveguide of the first edge waveguide region and the second edge waveguide region comprises a first waveguide.

7. The binary photonics lattice of claim 1, wherein the first edge waveguide region and the second edge waveguide region each comprise the same number of waveguides.

8. The binary photonics lattice of claim 1, wherein the binary waveguide region comprises:
   a central waveguide corresponding with a unit digit of the symmetrical binary representation, the central waveguide comprising a first waveguide or a second waveguide and;
   a first binary segment positioned between the central waveguide and the first edge waveguide region, wherein:
   the first binary segment corresponds with one or more secondary digits of the symmetrical binary representation; and
   the first binary segment comprises at least one first waveguide, at least one second waveguide, or both at least one first waveguide and at least one second waveguide; and
   a second binary segment positioned between the central waveguide and the second edge waveguide region, wherein:
   the second binary segment corresponds with one or more mirrored secondary digits of the symmetrical binary representation; and
   the second binary segment comprises at least one first waveguide, at least one second waveguide, or both at least one first waveguide and at least one second waveguide.

9. The binary photonics lattice of claim 1, wherein the binary waveguide region comprises:
   a central waveguide comprising a modified second waveguide and corresponding with a unit digit of the symmetrical binary representation, wherein:
   the modified second waveguide comprises a lower refractive index than the one or more second waveguides and corresponds with a digit 1 of the symmetrical binary representation;
   a first binary segment positioned between the central waveguide and the first edge waveguide region, wherein:
   the first binary segment corresponds with one or more secondary digits of the symmetrical binary representation; and
   the first binary segment comprises at least one first waveguide, at least one second waveguide, or both at least one first waveguide and at least one second waveguide; and
   a second binary segment positioned between the central waveguide and the second edge waveguide region, wherein:
   the second binary segment corresponds with one or more mirrored secondary digits of the symmetrical binary representation; and
   the second binary segment comprises at least one first waveguide, at least one second waveguide, or both at least one first waveguide and at least one second waveguide.

10. The binary photonics lattice of claim 9, wherein the difference in refractive index between the modified second waveguide and a second waveguide is less than the difference in refractive index between the modified second waveguide and a first waveguide.

11. The binary photonics lattice of claim 1, wherein:

$$V_1 = (2\pi a_1)\left(\frac{NA_1}{\lambda}\right),$$

wherein $$NA_1 = \left(n_{WG1}^2 - n_{CLAD}^2\right)^{\frac{1}{2}},$$

$n_{GW1}$ is the refractive index of the one or more first waveguides, $n_{CLAD}$ is the refractive index of the substrate, $a_1$ is a radius of the one or more first waveguides, and $\lambda$ is the wavelength of one or more photons propagating along the one or more first waveguides; and $$V_2 = (2\pi a_2)\left(\frac{NA_2}{\lambda}\right)$$

where $$NA_2 = \left(n_{WG2}^2 - n_{CLAD}^2\right)^{\frac{1}{2}},$$

$n_{WG2}$ is the refractive index of the one or more second waveguides, $n_{CLAD}$ is the refractive index of the substrate, $a_2$ is a radius of the one or more second waveguides, and $\lambda$ is the wavelength of one or more photons propagating along the plurality of single mode waveguides.

12. The binary photonics lattice of claim 11, wherein the one or more first waveguides each comprise a smaller refractive index than the one or more second waveguides.

13. The binary photonics lattice of claim 11, wherein the one or more first waveguides each comprise a smaller diameter than the one or more second waveguides.

14. The binary photonics lattice of claim 1, wherein:
the plurality of single mode waveguides are uniformed spaced in the linear distribution; and
a spacing distance between each adjacent pair of waveguides in the plurality of single mode waveguides comprises about 30 µm or less.

15. An optical system comprising:
the binary photonics lattice of claim 1; and
a photon source optically coupled to an input end of a central waveguide of the binary waveguide region.

16. The optical system of claim 15, further comprising one or more photon detectors optically coupled to an output end of at least one waveguide of the plurality of single mode waveguides.

17. The optical system of claim 16, wherein an output end of each waveguide of the waveguide array is optically coupled to one of the one or more photon detectors.

18. The optical system of claim 15, further comprising a plurality of photon pathways each optically coupled to an output end of an individual waveguide of the plurality of single mode waveguides such that the binary photonics lattice is a beam splitter.

19. A method of optically representing of a binary number, the method comprising directing a plurality of photons generated using a photon source into an input end of a central waveguide of a binary waveguide region of a waveguide array of a binary photonics lattice, wherein the waveguide array comprises:
a plurality of single mode waveguides disposed in a substrate, the plurality of single mode waveguides including one or more first waveguides comprising a first V-number $V_1$ and one or more second waveguides comprising a second V-number $V_2$ wherein:
the first V-number $V_1$ is smaller than the second V-number $V_2$;
the one or more first waveguides and the one or more second waveguides are arranged in a linear distribution comprising the binary waveguide region, a first edge waveguide region, and a second edge waveguide region, wherein:
the binary waveguide region is positioned between the first edge waveguide region and the second edge waveguide region;
the binary waveguide region comprises a symmetrical binary representation of a decimal number; and
the binary waveguide region comprises at least one first waveguide representing a digit 0 of the symmetrical binary representation, at least one second waveguide representing a digit 1 of the symmetrical binary representation, or both at least one first waveguide representing a digit 0 of the symmetrical binary representation and at least one second waveguide representing a digit 1 of the symmetrical binary representation;
receiving the plurality of photons using one or more photon detectors, wherein each of the one or more photon detectors is optically coupled to an output end of at least one of the plurality of single mode waveguides; and
measuring an output power distribution based on the plurality of photons received by the one or more photon detectors, wherein the output power distribution corresponds with the symmetrical binary representation of the decimal number.

20. The method of claim 19, further comprising determining the binary number and the decimal number that each correspond with the symmetrical binary representation of the output power distribution.

21. The method of claim 19, wherein the decimal number is two or greater.

22. The method of claim 19, wherein the decimal number is four or greater.

23. The method of claim 19, wherein the decimal number is eight or greater.

24. The method of claim 19, wherein:
each waveguide of the first edge waveguide region and the second edge waveguide region comprises a first waveguide; and
the first edge waveguide region and the second edge waveguide region each comprise the same number of waveguides.

25. The method of claim 19, wherein, the binary waveguide region comprises:
the central waveguide, which corresponds with a unit digit of the symmetrical binary representation and comprises a first waveguide or a second waveguide and;
a first binary segment positioned between the central waveguide and the first edge waveguide region, wherein:
the first binary segment corresponds with one or more secondary digits of the symmetrical binary representation; and the first binary segment comprises at least one first waveguide, at least one second waveguide, or both at least one first waveguide and at least one second waveguide; and a second binary segment positioned between the central waveguide and the second edge waveguide region, wherein:
the second binary segment corresponds with one or more mirrored secondary digits of the symmetrical binary representation; and
the second binary segment comprises at least one first waveguide, at least one second waveguide, or both at least one first waveguide and at least one second waveguide.

26. The method of claim 19, wherein:

$$V_1 = (2\pi a_1)\left(\frac{NA_1}{\lambda}\right),$$

where $$NA_1 = \left(n_{WG1}^2 - n_{CLAD}^2\right)^{\frac{1}{2}},$$

$n_{WG1}$ is the refractive index of the one or more first waveguides, $n_{CLAD}$ is the refractive index of the substrate, $a_1$ is a radius of the one or more first waveguides, and $\lambda$ is the wavelength of one or more photons propagating along the one or more first waveguides; and $$V_2 = (2\pi a_2)\left(\frac{NA_2}{\lambda}\right)$$

where $$NA_2 = \left(n_{WG2}^2 - n_{CLAD}^2\right)^{\frac{1}{2}},$$

$n_{WG2}$ is the refractive index of the one or more second waveguides, $n_{CLAD}$ is the refractive index of the substrate, $a_2$ is a radius of the one or more second waveguides, and $\lambda$ is the wavelength of one or more photons propagating along the plurality of single mode waveguides.

\* \* \* \* \*

UNITED STATES PATENT AND TRADEMARK OFFICE
CERTIFICATE OF CORRECTION

PATENT NO. : 12,181,711 B2
APPLICATION NO. : 17/766793
DATED : December 31, 2024
INVENTOR(S) : Borrelli et al.

Page 1 of 1

It is certified that error appears in the above-identified patent and that said Letters Patent is hereby corrected as shown below:

In the Claims

Column 21 Line 11 Claim 11, delete "$n_{GW1}$" and insert --$n_{WG1}$--

Signed and Sealed this
Fifth Day of August, 2025

Coke Morgan Stewart
*Acting Director of the United States Patent and Trademark Office*